United States Patent [19]

Køhnke

[11] Patent Number: 5,383,786

[45] Date of Patent: Jan. 24, 1995

[54] TRAINING MANIKIN FOR PRACTICING EXTERNAL CARDIAC MASSAGE

[75] Inventor: Ole B. Køhnke, Lyngby, Denmark

[73] Assignee: Ambu International A/S, Glostrup, Denmark

[21] Appl. No.: 28,125

[22] Filed: Mar. 9, 1993

[30] Foreign Application Priority Data

Mar. 12, 1992 [DK] Denmark .................. 0329/92

[51] Int. Cl.⁶ ............................................. G09B 23/28
[52] U.S. Cl. .................................................. 434/265
[58] Field of Search ..................... 434/265, 275, 262

[56] References Cited

U.S. PATENT DOCUMENTS

| | | | |
|---|---|---|---|
| 3,068,509 | 12/1962 | Padellford | 434/265 |
| 3,209,465 | 10/1965 | James | 434/265 |
| 3,276,147 | 10/1966 | Padellford | 434/265 |
| 4,001,950 | 1/1977 | Blumensaadt | 434/265 |
| 4,331,426 | 5/1982 | Sweeney | 434/265 |
| 4,984,987 | 1/1991 | Brault et al. | 434/265 |
| 5,195,896 | 3/1993 | Sweeney et al. | 434/270 X |

Primary Examiner—Gene Mancene
Assistant Examiner—Jeffrey A. Smith
Attorney, Agent, or Firm—Watson, Cole, Grindle & Watson

[57] ABSTRACT

A training manikin for practising external cardiac massage, including chest expansion, comprises a partially compressible chest (22), a support plate (31) for a person to practice the cardiac massage, which plate (31) can be arranged in a position in which it extends to one side of the chest (22), and means, e.g. in the form of a bolt (29), for transferring a pull in the chest to the support plate (31).

6 Claims, 4 Drawing Sheets

TRAINING MANIKIN FOR PRACTICING EXTERNAL CARDIAC MASSAGE

BACKGROUND OF THE INVENTION

1. Field of the Invention

The present invention relates to a training manikin for practising external cardiac massage, including chest expansion, comprising a partially compressible chest. In particular, the invention relates to a training manikin for practising CPR (cardiopulmonary resuscitation) techniques.

2. The Prior Art

Cardiac arrest, which is a frequent cause of death, can arise from a stoppage of breathing e.g., in case of drowning accidents, electrical shocks or diseases, such as arteriosclerosis, cardiac infarct and cardiac block.

The treatment of cardiac arrest comprises resuscitation treatments including i.a., cardiac massage. When performing external cardiac massage, the patient is placed on a solid support, and the person performing the cardiac massage kneels by the side of the patient's chest and applies rhytmical pressures on the patient's sternum with the palm of his hand. A cardiac arrest is normally accompanied by respiratory arrest, and, therefore, it is necessary to administer artifical respiration in connection with the cardiac massage.

CPR resuscitation techniques, i.e., techniques comprising both cardiac massage and artifical respiration, are widely used by rescuers and doctors, but as an incorrect cardiac massage may cause injury to the patient, there is a need for thoroughly practising at these techniques.

For this purpose a variety of training manikins have been devised. Such a training manikin is disclosed in U.S. Pat. No. 4,984,987. This prior art training manikin comprises a head having a mouth and a neck portion connected with the oral cavity on the one side and a lung device on the other side. The lung device is in the form of an inflatable bag located in the chest comprising a front plate, a rear plate and an intervening compressible bag.

When using the prior art training manikin, artifical respiration is practised by blowing air into the mouth of the manikin, from which it flows into the inflatable bag which, when inflated, exerts a pressure on the front plate of the chest, thereby causing the chest to rise.

The practising of an artificial respiration is alternated at intervals with the practising of cardiac massage, which is effected by exerting a vertical pressure on the front plate of the chest so that it moves towards the rear plate under simultaneous compression of the bag. When the pressure ceases, the bag causes the front plate to return to its starting position.

Recently it has been found that the effect of cardiac massage is increased if the cardiac compression and the subsequent release of pressure, during which the chest resumes its original volume, is supplemented with a chest expansion caused by an upward pull. Such a chest expansion has been found to produce increased blood circulation and lung ventilation.

The chest expansion can be performed by using a pull member in the form of a resilient suction cup. When the pull member is pressed against the chest, the suction cup becomes deformed, thereby squeezing out the air. When the pressure on the suction cup ceases, the suction cup will try to resume its original configuration, and as a result thereof a vacuum is created in the interior of the suction cup. Further pulling of the suction cup increases the vacuum, thus causing the pull member to be strongly attached to the chest.

In order to facilitate transport and storage, the prior art training manikins for practising cardiac massage and optionally artifical respiration are relatively light, and therefore chest expansion on such training manikins cannot be performed unless they are attached to a support, e.g., a floor. However, such attachment will make it difficult to use the training manikin, and hence the manikin can only be used in places allowing such attachment.

SUMMARY OF THE INVENTION

The above attachment of a training manikin of the type mentioned above to a support is avoided with the manikin according to the invention, which training manikin further comprises a support member for the person practising cardiac massage, which support member can be arranged in a position in which it extends to one side of the chest (beyond a side of the chest), and means for transferring a pull in the chest to the support member.

The invention is based on the discovery that the weight of the person practising cardiac massage can be used to counterweight the pull in the chest necessary to obtain a chest expansion, thereby preventing the relatively light training manikin from being lifted during the practice of chest expansion in connection with external cardiac massage.

In order to secure a satisfactory stability the support member should have a length $X_2$, as measured from the knee of the practising person to the outer edge of the support member, which is:

$$X_2 \geq \frac{F - M_M}{M_R + M_M - F} \cdot X_1$$

wherein $X_1$ is the distance from the middle of the chest to the point of rest on the support member of the knee of the practising person, $M_M$ is the weight of the training manikin, $M_R$ is the weight of the practising person, and F is the pull exerted on the manikin's chest during the chest expansion, see FIG. 6.

The support member is preferably a plate, e.g., a substantially plane wood or plastic board. Optionally the plate may have recesses or cushions intended for the knees of the practising person.

In a preferred embodiment of the training manikin according to the invention wherein the support member is a plate, the pull transfer means preferably consists of a rod-shaped connecting member having one end connected with the underside of the chest and the other end provided with a head mounted displacably in a groove formed in the support plate.

The above mentioned connection between the chest and the support plate presents the advantage that after use the plate can be turned below the training manikin and optionally be displaced in the longitudinal direction thereof so that the packaging volume of the manikin is not increased and so that the position of the training manikin in relation to the support plate can be adjusted as desired by the person who is to practise cardiac massage.

A further embodiment of the training manikin according to the invention comprises a first plate having one edge hinged to the underside of a second plate attached to the underside of the chest, the hinge connection being located at such a distance from the edge of the second plate that it partially overlaps the first plate in its extended position.

This embodiment presents the advantage that, after use of the training manikin the first plate can be turned below the second plate so that the two plates become parallel to each other and optionally are in contact with each other below the chest, and thus take up only little space during transport.

In a further embodiment of the training manikin according to the invention, the underside of the chest comprises a rigid plate and rigid bars are attached to the upper side of the support plate and disposed in such a distance from the support plate and the edge thereof that the bars can be slid over the rigid plate and thereby transfer an upward pull to the support plate.

In this embodiment the rigid bars prevent the chest from being lifted during the chest expansion, and when the practising has been finished the support plate can be readily disengaged from the rigid plate attached to the underside of the chest and be placed behind the rigid plate parallel thereto.

The training manikin according to the invention preferably also comprises a helical spring or an air-tight bag located between the front wall and the rear wall of the chest, the spring or bag serving to generate a lifelike resistance against depression and a return of the chest to its starting position after the exertion of a pressure thereon.

BRIEF DESCRIPTION OF THE DRAWINGS

The invention will now be explained in further detail with reference to the drawings, wherein FIG. 1 schematically illustrates the practising of external cardiac massage using a preferred embodiment of the training manikin according to the invention.

DETAILED DESCRIPTION OF THE PREFERRED EMBODIMENTS

Figure 1:
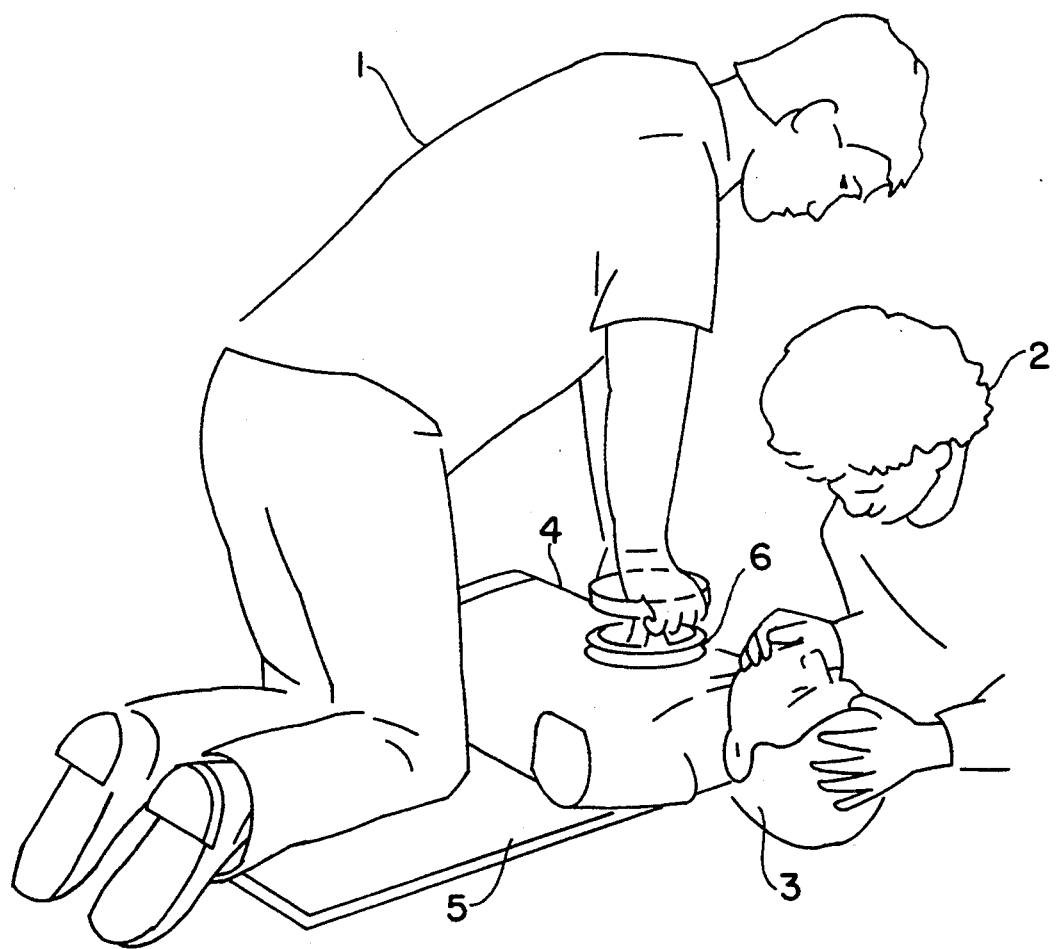

FIG. 1 shows two persons 1 and 2 practising external cardiac massage on a training manikin comprising a head 3 connected to a chest 4 via a neck (not shown), the chest 4 being attached to a support plate 5.

As will appear from FIG. 1, the first person 1 kneels on the support plate 5, and utilizing his own weight, he is capable of performing chest expansion by pulling a suction cup 6 connected to the chest 4 without causing the chest 4 to be lifted from the ground. As will also appear from FIG. 1, the second person 2 is ready to practice artificial respiration by the mouth-to-mouth method.

Figure 2:
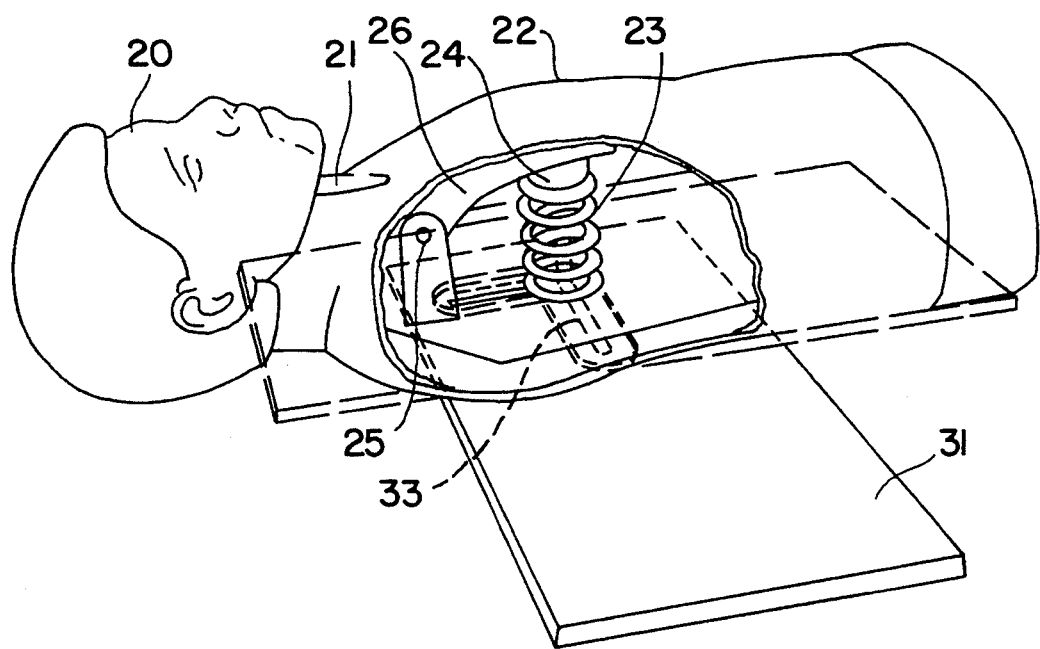
FIG. 2 is a perspective view of another embodiment of the training manikin according to the invention, in which certain portions of the manikin are cut away.
Figure 3:
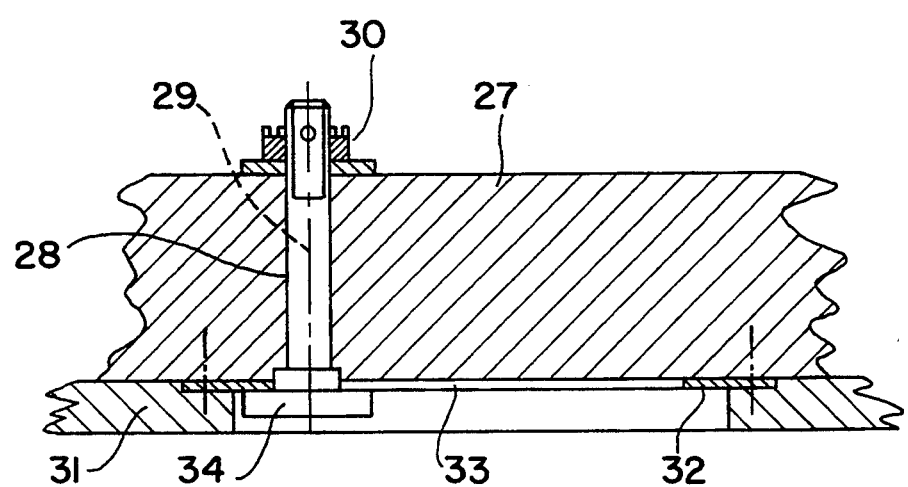
FIG. 3 is a vertical sectional view of a portion of the connecting members between the support plate and the chest of the training manikin according to FIG. 2.

The embodiment of the training manikin of the invention shown in FIGS. 2 and 3 comprises a head 20 connected via a neck 21 to a hollow chest 22 which is kept expanded by a helical spring 23, the upper end of which surrounds a thrust pad 24 contacting the underside of a lever arm 26 mounted pivotably on a horizontal pin 25. As will appear from FIG. 3, the underside of the chest 22 comprises a plate 27 having a hole 28 with a bolt 29 mounted therein, the upper end of the bolt having a thread onto which a nut 30 is screwed.

The training manikin further comprises a support plate 31 having a recess with a metal plate 32 having an oblong groove 33 mounted in said recess. The lower end of the bolt 29 is located in the groove 33 and maintained therein by a bolt head 34, the support plate 31 being displaceable and rotatable parallel to the plate 27, e.g., between the positions shown in full lines and broken lines, respectively, in FIG. 2. In the latter position the support plate 31 is located close to the rear side of the chest 22.

Figure 4:
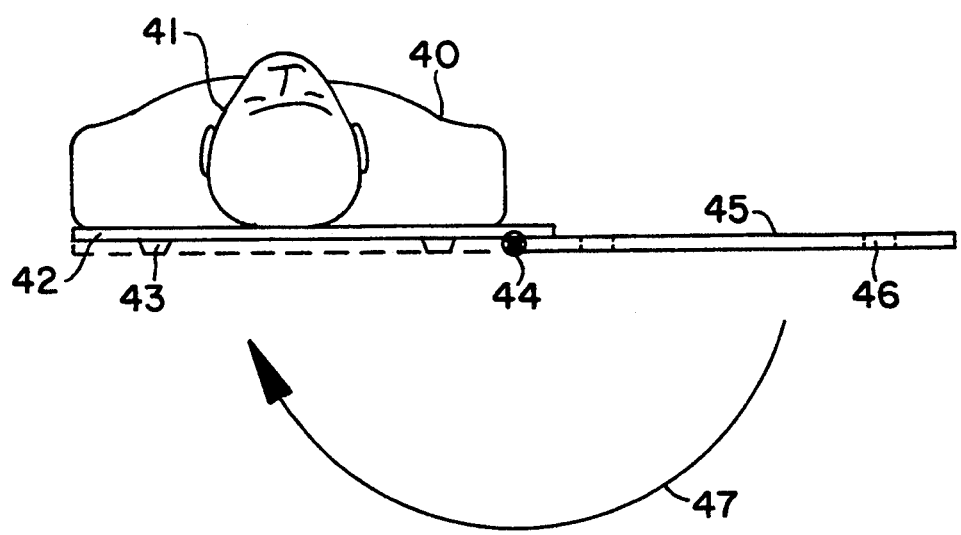
FIG. 4 is a schematic view of a further embodiment of a training manikin according to the invention, as seen towards the head of the training manikin.
Figure 6:
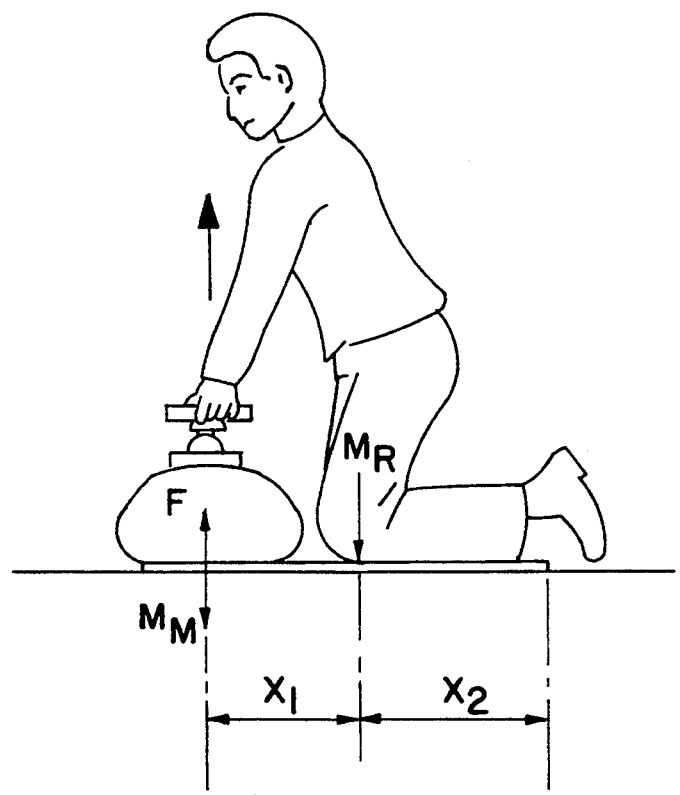

The training manikin shown in FIG. 4 comprises a chest 40 having a head 41, the chest being connected to a plate 42 having support legs 43. By means of a hinge 44 the plate 42 is connected to a support plate 45 containing holes 46 disposed in such a manner that the support legs 43 are positioned in these holes when the support plate 45 after use is brought into a position in which it is located below the plate 42 by swinging it around the hinge 44 as shown by the arrow 47.

When in the extended position shown in FIG. 4, the plate 42 overlaps the plate 45 at the hinge connection 44, thereby preventing it from being turned around the hinge 44 when the chest 40 is exposed to an upward pull in connection with a chest expansion as shown in FIG. 1.

Figure 5:
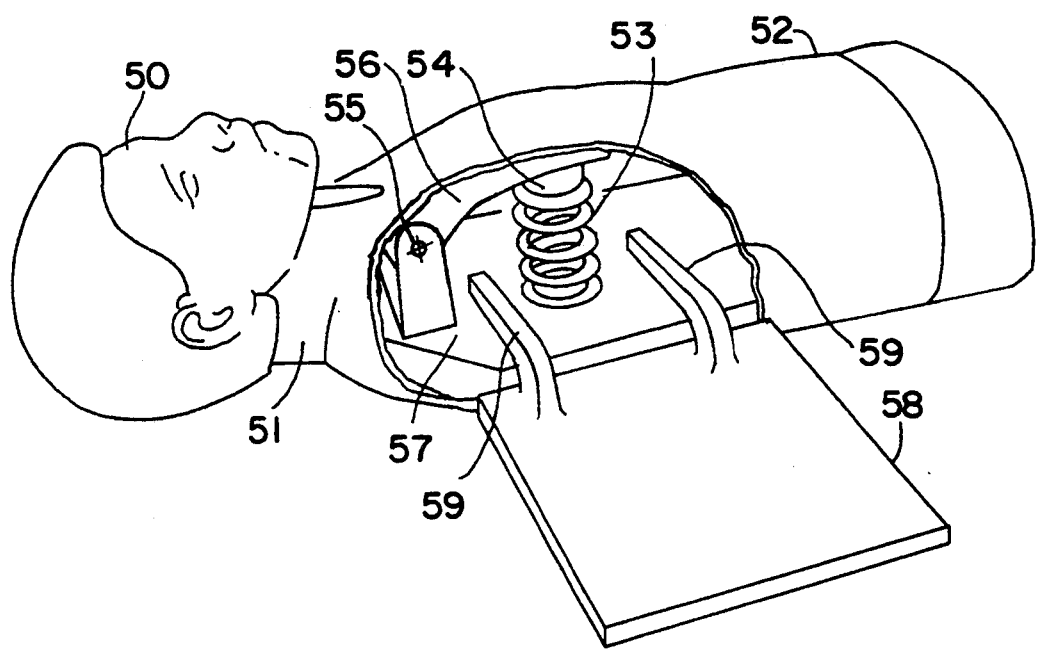
FIG. 5 is a perspective view of a further embodiment of the training manikin according to the invention, in which certain portions of the manikin are cut away, and FIG. 6 schematically illustrates the position of a practising person in relation to a training manikin according to the invention.

The training manikin shown in FIG. 5 corresponds to the one shown in FIGS. 2 and 3 except for the attachment of the support plate. Thus, the training manikin according to FIG. 5 comprises a head 50 connected via a neck 51 to a hollow chest 52 which is kept expanded by a helical spring 53, the upper end of which surrounds a thrust pad 54 contacting the underside of a lever arm 56 mounted pivotably on a tap 55. The underside of the chest comprises a rigid plate 57. The training manikin also comprises a loose support plate 58 having two rigid arms 59 which, when the support plate is positioned beside the rigid plate 57, engage over the latter and prevent the training manikin from being lifted from the ground during the exertion of an upward pull on the chest 52. After use the support plate 58 can be readily disengaged from the rigid plate 57 and be placed longitudinally to the plate when packaged.

I claim:

1. A training manikin for a person practising external cardiac massage, including chest expansion, comprising chest means defining opposite sides, a support member for the practising person, said support member being such that it can be placed in a position beneath said chest means, said support member operatively connected to said chest means and extending outwardly beyond one of said opposite sides of the chest means, and means for transferring a pull exerted on the chest means to the support member.

2. A training manikin according to claim 1, wherein a length $X_2$ of the support member, as measured from a knee of the practising person to an outer edge of the support member, is:

$$X_2 \geq \frac{F - M_M}{M_R + M_M - F} \cdot X_1$$

wherein $X_1$ is the distance from the middle of the chest means to the point of rest of the knee of the practising person on the support member, $M_M$ is the weight of the training manikin, $M_R$ is the weight of the practising person, and F is the pull exerted on the chest means of the training manikin during expansion of the chest means.

3. A training manikin according to claim 1, wherein the support member is a plate.

4. A training manikin according to claim 3, wherein the pull transfer means is a rod-shaped connecting member connected at one end thereof to an underside of the chest means and provided at an opposite end thereof with a head mounted displaceably in a groove formed in the support plate.

5. A training manikin according to claim 3, wherein an underside of the chest means comprises a rigid plate and rigid bars are attached to a topside of the support plate, said bars having a shape allowing them slide over the rigid plate, thereby transferring an upward pull to the support plate.

6. A training manikin according to claim 1, wherein said support member comprises a first plate having one edge hinged to the underside of a second plate attached to the underside of the chest means, the hinge being located at such a distance from the edge of the second plate that the first plate can be rotated between a position wherein it is substantially parallel with said second plate to a position where it is essentially coplanar with said second plate.

* * * * *